United States Patent
Rehwald et al.

(10) Patent No.: US 9,714,635 B2
(45) Date of Patent: Jul. 25, 2017

(54) HOLDER FOR FASTENING A FUEL DISTRIBUTOR TO AN INTERNAL COMBUSTION ENGINE

(71) Applicant: Robert Bosch GmbH, Stuttgart (DE)

(72) Inventors: Andreas Rehwald, Bietigheim-Bissingen (DE); Klaus Lang, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/786,047

(22) PCT Filed: Feb. 26, 2014

(86) PCT No.: PCT/EP2014/053685
§ 371 (c)(1),
(2) Date: Oct. 21, 2015

(87) PCT Pub. No.: WO2014/173560
PCT Pub. Date: Oct. 30, 2014

(65) Prior Publication Data
US 2016/0069315 A1 Mar. 10, 2016

(30) Foreign Application Priority Data
Apr. 23, 2013 (DE) .................. 10 2013 207 367

(51) Int. Cl.
*F02M 69/46* (2006.01)
*F16B 31/02* (2006.01)
(Continued)

(52) U.S. Cl.
CPC ........ *F02M 69/465* (2013.01); *F02M 55/025* (2013.01); *F16B 5/02* (2013.01);
(Continued)

(58) Field of Classification Search
CPC ..... F02M 69/465; F02B 77/00; F16B 31/028; F16B 43/001; F16B 35/041; F16B 5/02
(Continued)

(56) References Cited

U.S. PATENT DOCUMENTS

| | | | | |
|---|---|---|---|---|
| 4,732,519 A | * | 3/1988 | Wagner | F16B 5/0258 403/14 |
| 4,934,888 A | * | 6/1990 | Corsmeier | F16B 41/002 411/107 |

(Continued)

FOREIGN PATENT DOCUMENTS

| | | |
|---|---|---|
| DE | 196 54 848 | 6/1997 |
| DE | 10 2010 046 344 | 6/2011 |
| EP | 2 657 504 | 10/2013 |

OTHER PUBLICATIONS

International Search Report for PCT/EP2014/053685, dated Apr. 16, 2014.

*Primary Examiner* — Mahmoud Gimie
(74) *Attorney, Agent, or Firm* — Norton Rose Fulbright US LLP; Gerard Messina

(57) ABSTRACT

A holder for attachment of a component, in particular a fuel distributor, to an internal combustion engine includes: at least one decoupling element, an attachment body, an attachment element, and a holding element. The attachment body is attached to the internal combustion engine by way of the attachment element. The holding element is attached to the attachment body via the decoupling element. The decoupling element is shaped in such a way that in at least one spatial direction, a nonlinear spring characteristic curve, which describes a correlation of a return force acting on the holding element with a deflection of the holding element relative to the attachment body, is predefined.

14 Claims, 13 Drawing Sheets

(51) Int. Cl.
*F16B 35/04* (2006.01)
*F16B 5/02* (2006.01)
*F16B 43/00* (2006.01)
*F02M 55/02* (2006.01)
*F02B 77/00* (2006.01)

(52) U.S. Cl.
CPC .......... *F16B 31/028* (2013.01); *F16B 35/041* (2013.01); *F16B 43/001* (2013.01); *F02B 77/00* (2013.01); *F02M 2200/09* (2013.01)

(58) Field of Classification Search
USPC .......... 123/470, 456; 411/107, 108, 354, 45, 411/970, 999
See application file for complete search history.

(56) References Cited

U.S. PATENT DOCUMENTS

| | | | | |
|---|---|---|---|---|
| 4,952,107 A * | 8/1990 | Dupree | ................ | F16B 41/002 411/103 |
| 5,020,951 A * | 6/1991 | Smith | ................ | F01L 1/46 411/107 |
| 5,044,338 A * | 9/1991 | Shelton | ................ | F02M 69/465 123/456 |
| 5,094,579 A * | 3/1992 | Johnson | ................ | F02B 77/00 411/107 |
| 5,290,132 A * | 3/1994 | Gnage | ................ | F16B 41/002 411/107 |
| 5,397,206 A | 3/1995 | Sihon | | |
| 5,871,319 A * | 2/1999 | Schneider | ............. | F16B 43/001 411/107 |
| 6,591,801 B1 | 7/2003 | Fonville | | |
| 7,591,246 B2 * | 9/2009 | Beardmore | .......... | F02M 55/025 123/456 |
| 8,844,502 B2 * | 9/2014 | Solferino | ................ | B23P 19/00 123/456 |
| 2010/0071664 A1 * | 3/2010 | Hunt | ................ | F02M 55/025 123/456 |
| 2010/0202856 A1 | 8/2010 | Donovan | | |
| 2013/0104852 A1 * | 5/2013 | Kannan | ................ | F02M 61/168 123/456 |
| 2013/0340714 A1 * | 12/2013 | Serra | ................ | F02M 55/025 123/456 |
| 2015/0090229 A1 * | 4/2015 | Lang | ................ | F02M 55/025 123/470 |
| 2015/0176672 A1 * | 6/2015 | Rehwald | ................ | F02M 55/025 123/470 |

* cited by examiner

HOLDER FOR FASTENING A FUEL DISTRIBUTOR TO AN INTERNAL COMBUSTION ENGINE

BACKGROUND OF THE INVENTION

1. Field of the Invention

The present invention relates to a holder for attaching a component, in particular a fuel distributor, to an internal combustion engine. The invention relates especially to the sector of fuel injection systems of internal combustion engines, fuel at high pressure being injected via fuel injection valves into associated combustion chambers of the internal combustion engine.

2. Description of the Related Art

Published German patent application document DE 10 2010 046 344 A1 discloses an engine subassembly having a fuel rail that is attached to a camshaft cover. The engine subassembly can encompass a cylinder head, the camshaft cover, and a fuel rail subassembly. The fuel rail subassembly can encompass the fuel rail, a clamp subassembly, and a fuel injection device. The clamp subassembly can be secured to the fuel rail, and it can encompass an attachment element and an isolating element. The attachment element can be in engagement with the camshaft cover and can attach the fuel rail thereto. In a possible embodiment, the attachment subassembly can have attachment elements, spacers, and a sleeve, as well as a first and a second isolating element. The attachment elements can have a head and a shaft having a threaded region that is in engagement with an opening in the camshaft cover in order to attach the fuel rail to the camshaft cover. The attachment element extends through the sleeve. The first isolating element can be disposed axially between a first side of the clamp and the camshaft cover. The second isolating element can be disposed axially between the second side of the clamp and the head of the attachment element. The isolating elements can be constituted from an elastomeric material that provides damping.

The engine subassembly known from published German patent application document DE 10 2010 046 344 A1 has the disadvantage that the isolating elements define an almost constant spring stiffness because of their rectangular profile. This results in some cases, in the respective application instance, in only limited effectiveness in terms of vibration damping. In addition, temperature-related changes in the length of the individual elements of the attachment occur during operation. Because of the different materials that are utilized, this results in an effective change in the length of the isolating elements, which leads to a change in the preload on the isolating elements. The result is thus that the instantaneous preload on the isolating elements depends on the operating temperature. This also results in a corresponding correlation in the context of vibration damping. Vibration damping effectiveness thus changes during operation. Specifically, the effects of vibration damping upon initial operation and after a certain operating time span are thus different. Tuning the attachment system for a high operating temperature that is reached after a certain operating time span thus necessarily results in poor vibration damping upon initial operation, and vice versa.

BRIEF SUMMARY OF THE INVENTION

The holder according to the present invention has the advantage that improved vibration damping is enabled. Specifically, vibration damping can be suitable adapted with regard to the particular application instance.

The holder serves, for example, to attach a fuel distributor of a fuel injection system to a cylinder head of the internal combustion engine. The holder can also serve, however, for attachment of another component to the internal combustion engine. Furthermore, attachment to the internal combustion engine can also be accomplished indirectly via one or more intermediate pieces. The component, in particular the fuel distributor, and the internal combustion engine are not constituents of the holder according to the present invention. Embodiments in which the holding element is an integral constituent of a component, in particular of a fuel distributor, and/or in which a suitable countermember for attaching, in particular screwing in, the attachment means of the holder is shaped onto the internal combustion engine, in particular onto a cylinder head, are nevertheless conceivable.

The fuel distributor that is attachable to the internal combustion engine via one or more holders serves during operation as a fuel reservoir. Pressure fluctuations in the fuel distributor and in injectors connected to the fuel distributor result in the generation of pressure pulses that can cause noise. These pressure pulses can be passed on, inter alia, in the form of solid-borne sound at the contact points with the cylinder head. The decoupling element serves for damping. The holder optionally also makes possible, besides mechanical decoupling, thermal and geometric decoupling of the component, in particular the fuel distributor, with respect to the internal combustion engine. Multiple decoupling elements can also be utilized on one holder. Such decoupling elements are preferably configured as viscoelastic decoupling elements.

It is advantageous that the decoupling element is shaped in such a way that at least in an axial direction along an axis of the attachment body, a nonlinear spring characteristic curve, which describes a correlation of a return force acting on the holding element along the axis of the attachment body with a deflection of the holding element along the axis of the attachment body relative to the attachment body, is predefined. Attachment of the attachment body by way of the attachment means is preferably accomplished along the axis of the attachment body. The attachment means can be configured in particular as an attachment screw that, for example, is screwed into a corresponding threaded bore of the internal combustion engine. Reliable securing of the attachment body on the internal combustion engine is thereby possible.

The nonlinear spring characteristic curve along the axis of the attachment body allows a tuning to be performed with regard to vibrations that occur. It is also possible in this context for comparatively small deflections, such as those that also occur with changes in temperature, to occur in a region of the spring characteristic curve having a comparatively shallow slope. A comparatively steep slope of the spring characteristic curve can then become effective for larger deflections.

In addition, however, it is also advantageous that the decoupling element is not impinged upon by the force attaching the attachment means to the internal combustion engine. Separate setting of a preload of the decoupling element can be provided for this. The nonlinear spring characteristic curve, as well as a starting point, predefined by the preload of the decoupling element, on the nonlinear spring characteristic curve in the unloaded state (i.e. with an insignificant deflection of the holding element along the axis of the attachment body relative to the attachment body), can then be predefined with regard to the particular application instance in order to further improve decoupling.

It is also advantageous that the decoupling element is shaped in such a way that at least in a radial direction that is oriented perpendicularly to an axis of the attachment body, a nonlinear spring characteristic, which describes a correlation of a return force acting on the holding element along the radial direction with a deflection of the holding element along the radial direction relative to the attachment body, is predefined. Suitable tuning in the radial direction can thus be predefined by selecting the spring characteristic curve. This improves the decoupling that can be achieved with the holder.

A defined dynamic behavior both in the axial direction and in the radial direction can also be achieved by suitably shaping the decoupling element. Depending on the embodiment, here as well a largely independent tuning in an axial direction on the hand and in a radial direction on the other hand is possible.

It is also advantageous that the decoupling element is shaped in such a way that a first radial direction and a second radial direction, which are oriented perpendicularly to an axis of the attachment body, exist, for which a first spring characteristic curve that describes a correlation of a return force acting on the holding element along the first radial direction with a deflection of the holding element along the first radial direction relative to the attachment body, and a second spring characteristic curve that describes a correlation of a return force acting on the holding element along the second radial direction with a deflection of the holding element along the second radial direction relative to the attachment body, are different. The fact that the stiffness of the decoupling element is embodied to be rotationally non-symmetrical thus allows the implementation of suitable tuning for directionally differing stresses in radial directions.

It is possible in this connection for the first spring characteristic curve and the second characteristic curve to be embodied as a first linear spring characteristic curve and as a second linear spring characteristic curve which have different slopes, while a nonlinear spring characteristic curve is predefined in an axial direction. Preferably, however, the first spring characteristic curve or the second spring characteristic curve is a nonlinear spring characteristic curve. Also preferably, both the first spring characteristic curve and the second spring characteristic curve are predefined as a first nonlinear spring characteristic curve and as a second nonlinear spring characteristic curve.

During operation, a correspondingly superimposed stress on the decoupling element can ensue with reference to the respective deflection of the holding element which occurs relative to the attachment element. If the fuel distributor is configured, for example, as a fuel distributor rail, vibrations or vibration components acting along the fuel distributor rail, and vibrations or vibration components acting perpendicularly to the longitudinal axis of the fuel distributor rail, can then require different damping. This can be achieved by a suitable configuration of the decoupling element, a defined dynamic behavior in all three spatial dimensions being specifically enabled by way of the tuning of the respective stiffness values in the three spatial directions. Metallic contact in the region of the holding element can thereby also be prevented in all three spatial directions. This results in effective, defined, mechanically damping decoupling behavior in the individual spatial directions.

It is advantageous that the decoupling element has at least one conformation that interacts in positively fitting fashion with a conformation of the holding element. It is correspondingly advantageous that the decoupling element has at least one conformation that interacts in positively fitting fashion with a conformation of a preload element that is connected to the attachment body. The positive fit created in each case results in a positional immobilization of the decoupling element which is independent of any preload. A preload that may be necessary can be applied in suitable fashion by the preload element. Controlled adjustment of the preload is possibly by way of the preload element, which can be connected to the attachment body independently of the attachment means.

It is also advantageous that the decoupling element has at least one recess that is configured at a rim of an enveloping surface of the decoupling element. It is also advantageous that the decoupling element has at least one recess that is configured inside an enveloping surface of the decoupling element. A comparatively low spring constant can thereby initially be implemented at the beginning or for small deflections. At larger deflections the recess is, so to speak, "squeezed out," so that a comparatively high spring stiffness then results. A nonlinear characteristic of the spring characteristic curve can thus be achieved.

The recess at the rim of the enveloping surface of the decoupling element can advantageously be configured as an edge radius, as a bevel that extends over less than half the axial thickness of the decoupling element along an axis of the attachment body, or as a chamfer that extends over at least half of an axial thickness of the decoupling element along the axis of the attachment body. A nonlinear spring characteristic curve can thus be achieved by way of the conformation of the decoupling element in particular along the axis of the attachment body. The shape of the spring characteristic curve can be suitably modified by way of the configuration of the recess. Multiple recesses can also be provided on the decoupling element.

It is also advantageous that the decoupling element has at least one step at at least one enveloping surface. It is further advantageous that the decoupling element has at least one step at at least one end surface. Further possibilities for modifying the shape of the spring characteristic curve result therefrom. If the step is provided at the end surface of the decoupling element, then after a certain deflection during which the step is, so to speak, squeezed out, a more or less pronounced kink in the spring characteristic curve is then achieved. The step can be configured as a chamfered step or as a non-chamfered step. With an embodiment as a chamfered step, for example, it is possible to implement a superproportionally rising shape for the spring characteristic curve which, after the step is squeezed out, transitions into a linear course. Combinations with other conformations are, however, also possible here.

It is advantageous that the decoupling element has, at at least one end surface, a contact geometry that varies in a circumferential direction with respect to an axis of the attachment body. The contact geometry can thus be embodied varyingly over the circumference of the decoupling element, with the result that a rotationally non-symmetrical definition of the stiffness can be achieved in controlled fashion. It is especially advantageous in this context that the contact geometry at the end surface of the decoupling element is segmented in the circumferential direction. Only a local contact thus results in the initial state, in particular with the decoupling element in the unloaded state. With a certain impingement upon the decoupling element, however, a contact can optionally be created by overpressure. It is correspondingly advantageous that a radial contact component of the contact geometry at the end surface of the decoupling element varies in the circumferential direction. It is thereby possible, in particular, to achieve advantageous geometries that, upon tilting of the holding element relative to the axis of the attachment body, enable a stiffness that increases with the tilt.

It is to be noted that the features for shaping the decoupling element can be individually implemented not only once but also repeatedly on one decoupling element. Furthermore, such features for shaping the decoupling element can also be combined with one another in suitable fashion. Targeted adaptations to the particular application instance can thus be effected.

One or more advantages can therefore be achieved depending on the configuration. An acoustic decoupling can be established via an axial pre-elongation using adjustable damping dimensions. Optimization with regard to acoustic effectiveness is thereby possible. Component variability can furthermore be reduced.

A frequency-dependent stiffness curve, as well as frequency-dependent damping, can be dynamically tuned thanks to the possibility of adjustment. The adjustability is possible in particular by way of a pre-elongation dimension and the conformation, in particular a damper geometry. An adjustable and tunable transfer function results therefrom.

In addition to the damping of mechanical vibrations, thermal stresses introduced from the internal combustion engine into the fuel distributor can also be reduced. This makes possible better material utilization and thus a cost reduction with regard to the fuel distributor.

A tolerance compensation can furthermore be achieved. Permitted tolerances for the components that are used can possibly be enlarged. A relaxation of tolerances is thus possible. This allows for more inexpensive manufacture.

Optimization to a minimum component stress can also be accomplished. This relates in particular to the holding element, the decoupling element, and the fuel distributor.

The holding element, which can serve as a connecting piece to the fuel distributor, can be connected to the fuel distributor or can be a constituent of the fuel distributor, depending on the application instance. The holding element can thus be mounted on the fuel distributor or can be connected to the fuel distributor in positively or non-positively fitting fashion. The holding element can, especially, be soldered onto the fuel distributor.

The preferably viscoelastic decoupling resulting from the at least one decoupling element can also be embodied without a screw-shaped attachment. Snapping, clamping, or integration of the decoupling system into existing mounted parts, for example an intake module, a valve cover, a camshaft linkage, and other accessories, is likewise possible.

DETAILED DESCRIPTION OF THE INVENTION

Figure 1:
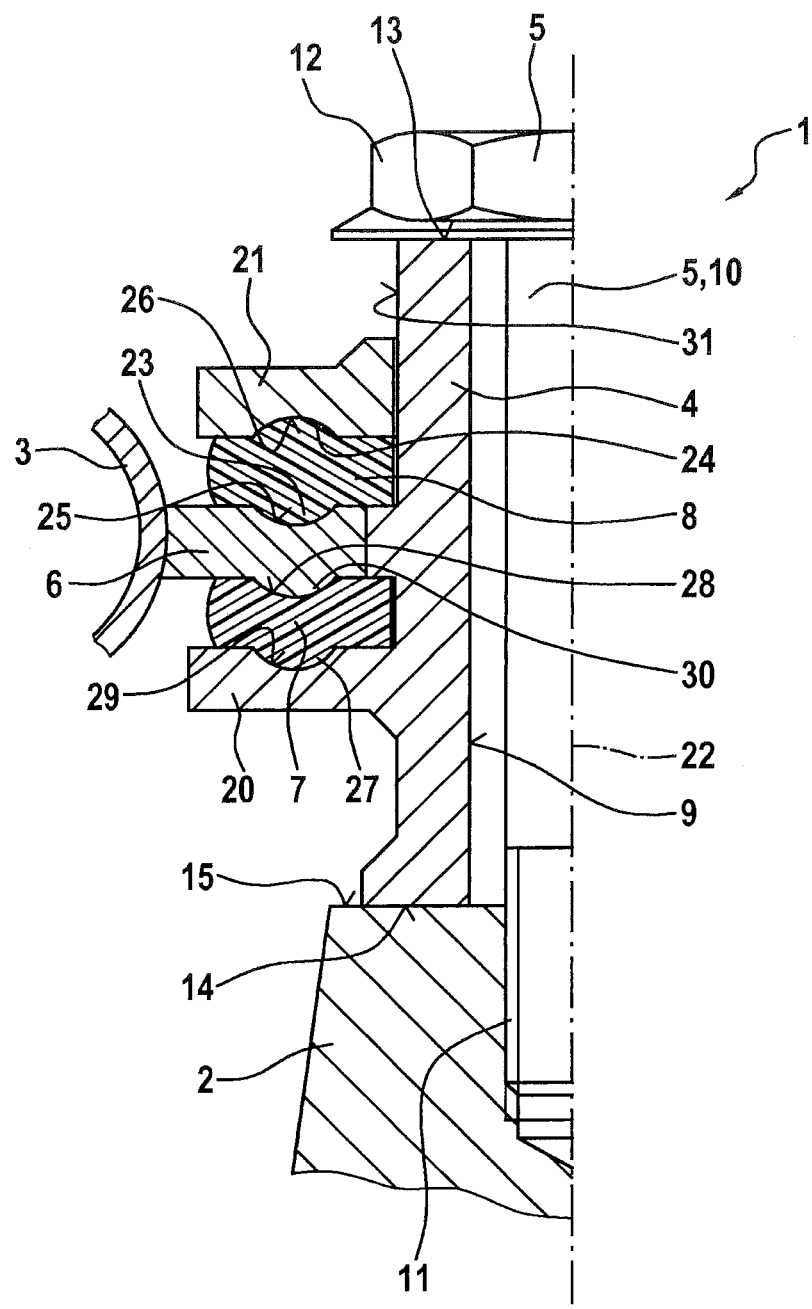
FIG. 1 is a partial schematic sectioned depiction of an internal combustion engine, a holder, and a fuel distributor, in accordance with a first exemplifying embodiment of the invention.

FIG. 1 is a partial schematic depiction of a holder 1; of part of an internal combustion engine 2, in particular a cylinder head 2; and of a fuel distributor 3, in particular a fuel distributor rail 3, in accordance with a first exemplifying embodiment. Holder 1 has an attachment body 4, an attachment means 5, and holding element 6, and decoupling elements 7, 8. In this exemplifying embodiment attachment body 4 has a passthrough hole 9 through which a threaded bolt 10 of attachment means 5 extends. Threaded bolt 10 is screwed into a threaded orifice 11 of internal combustion engine 2. Attachment means 5 furthermore has a screw head 12. Screw head 12 of attachment means 5 interacts with an end face 13 of attachment body 4. In addition, attachment body 4 is braced with a further end face 14 against an upper side 15 of internal combustion engine 2.

This results in reliable attachment of attachment body 4 of holder 1 to internal combustion engine 2. Decoupling elements 7, 8 are not impinged upon here by the attachment force that is applied by attachment means 5. The attachment force can be predefined to be of any magnitude, within certain limits.

Holder 1 furthermore has a support element 20 and a preload element 21. Support element 20 is configured as an annular support element 20 and, in this exemplifying embodiment, is configured integrally with attachment body 4. Preload element 21 is configured as an annular preload element 21. Upon assembly, preload element 21 can optionally be positioned along an axis 22 of attachment body 4 in order to achieve a preload on decoupling element 7, 8. In this exemplifying embodiment axis 22 is longitudinal axis 22 of passthrough hole 9, which in the assembled state coincides with longitudinal axis 22 of attachment means 5. Preload element 21 can be connected in suitable fashion to attachment body 4, for example by way of a screw connection or welded connection, or soldered connection.

Decoupling element 7 is configured as an annular decoupling element 7. Decoupling element 8 is configured as an annular decoupling element 8. Decoupling elements 7, 8 encompass attachment body 4 circumferentially with respect to axis 22.

Decoupling elements 7, 8 are shaped in such a way that in at least one spatial dimension, a nonlinear spring characteristic curve, which describes a correlation of a return force acting on holding element 6 with a deflection of holding element 6 relative to attachment body 4, is predefined. Holding element 6 is attached to attachment body 4 via decoupling elements 7, 8 as well as support element 20 and preload element 21. This results in an attachment of fuel distributor 3 to internal combustion engine 2, the nonlinear spring characteristic being correspondingly effective in the context of attachment.

Decoupling element 8 has conformations 23, 24 that are of bulge-shaped configuration. Conformation 23 of decoupling element 8 interacts in positively fitting fashion with a conformation 25 of holding element 6 which is configured as a depression 25. In addition, conformation 24 of decoupling element 8 interacts in positively fitting fashion with a conformation 26 of adjusting element 21 which is configured as a depression 26.

Decoupling element 7 furthermore has a conformation 27 that is of bulge-shaped configuration, and a conformation 28 that is configured as a depression 28. Conformation 27 of decoupling element 7 interacts in positively fitting fashion with a conformation 29 of support element 20 which is configured as a depression 29. In addition, conformation 28 of decoupling element 7 interacts in positively fitting fashion with a conformation 30 of holding element 6 which is of bulge-shaped configuration.

In addition to the positively fitting connection, a nonlinear spring characteristic curve is implemented by conformations 23, 24 of decoupling element 8 and conformations 27, 28 of decoupling element 7.

The stiffness of decoupling elements 7, 8 is thus predefinable by way of the conformation. A rotationally symmetrical configuration of decoupling elements 7, 8 can be predefined here. Configurations that are rotationally non-symmetrical are, however, also conceivable.

The preload travel can be adjusted independently of the attachment force of attachment means 5. This is possible in one or more spatial directions, depending on the configuration. Instead of one preload element 21, multiple preload elements can also be used here. Adjustability can also be achieved in a manner other than via a preload element. For example, the preload can be applied from regions of the attachment of fuel distributor 3. The connection of preload element 21, or the like, to attachment body 4 can be accomplished in positively or nonpositively fitting or intermaterially connected fashion. The preload that acts on decoupling elements 7, 8 is thus, especially, independent of tolerances of elements of holder 1, in particular of attachment body 4 and of attachment means 5, which generates the attachment force.

Figure 2:
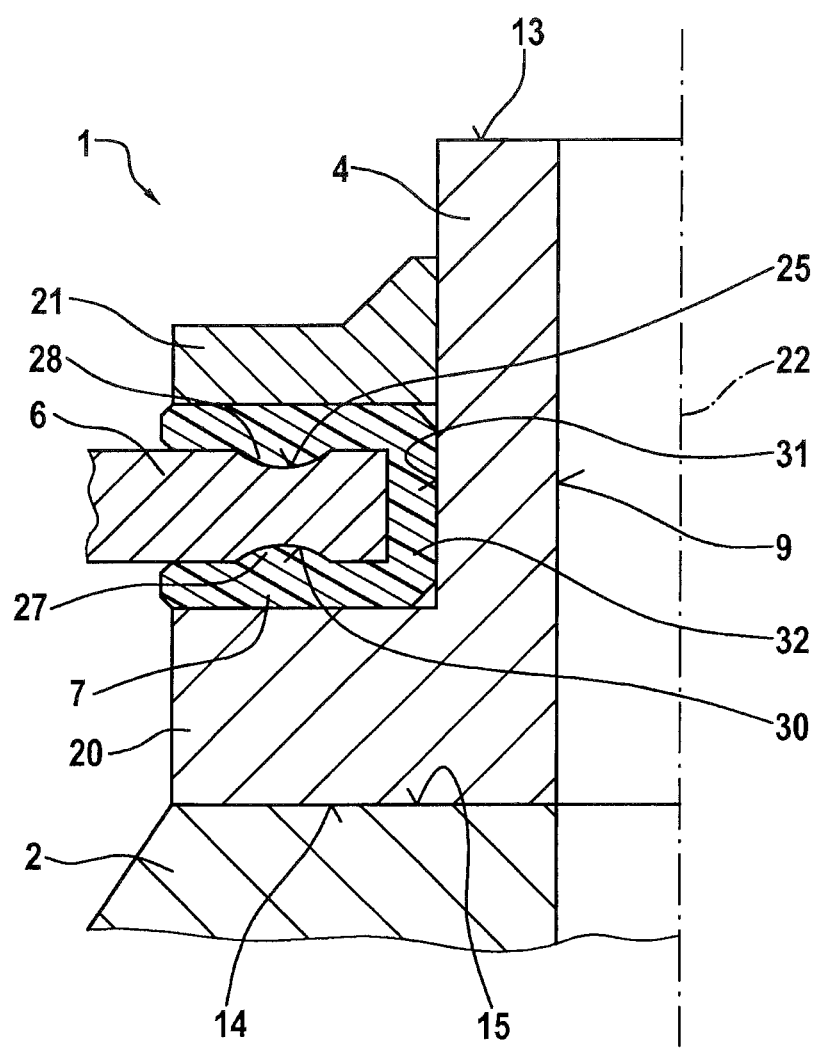
FIG. 2 is a partial schematic sectioned depiction of an internal combustion engine and a holder, in accordance with a second exemplifying embodiment of the invention.

FIG. 2 is a partial schematic sectioned depiction of an internal combustion engine 2 and a holder 1, in accordance with a second exemplifying embodiment. In this exemplifying embodiment further end face 14 of attachment body 4, with which attachment body 4 abuts against upper side 15 of internal combustion engine 2, is also configured on support element 20. Also in this exemplifying embodiment, exactly one decoupling element 7, which abuts both against support element 20 and against preload element 21, is provided. In this exemplifying embodiment conformations 25, 30 of holding element 6 are configured as depressions 25, 30. In this exemplifying embodiment conformations 27, 28 of decoupling element 7 are of bulge-shaped configuration, forming on the one hand a positive fit with conformation 25, and on the other hand a positive fit with conformation 30 of holding element 6.

In this exemplifying embodiment decoupling element 7 extends in the profile from preload element 21 along an outer side 31 of attachment body 4 to support element 20. A part 32 of decoupling element 7 here directly ensures isolation between holding element 6 and attachment body 4.

Figure 3:
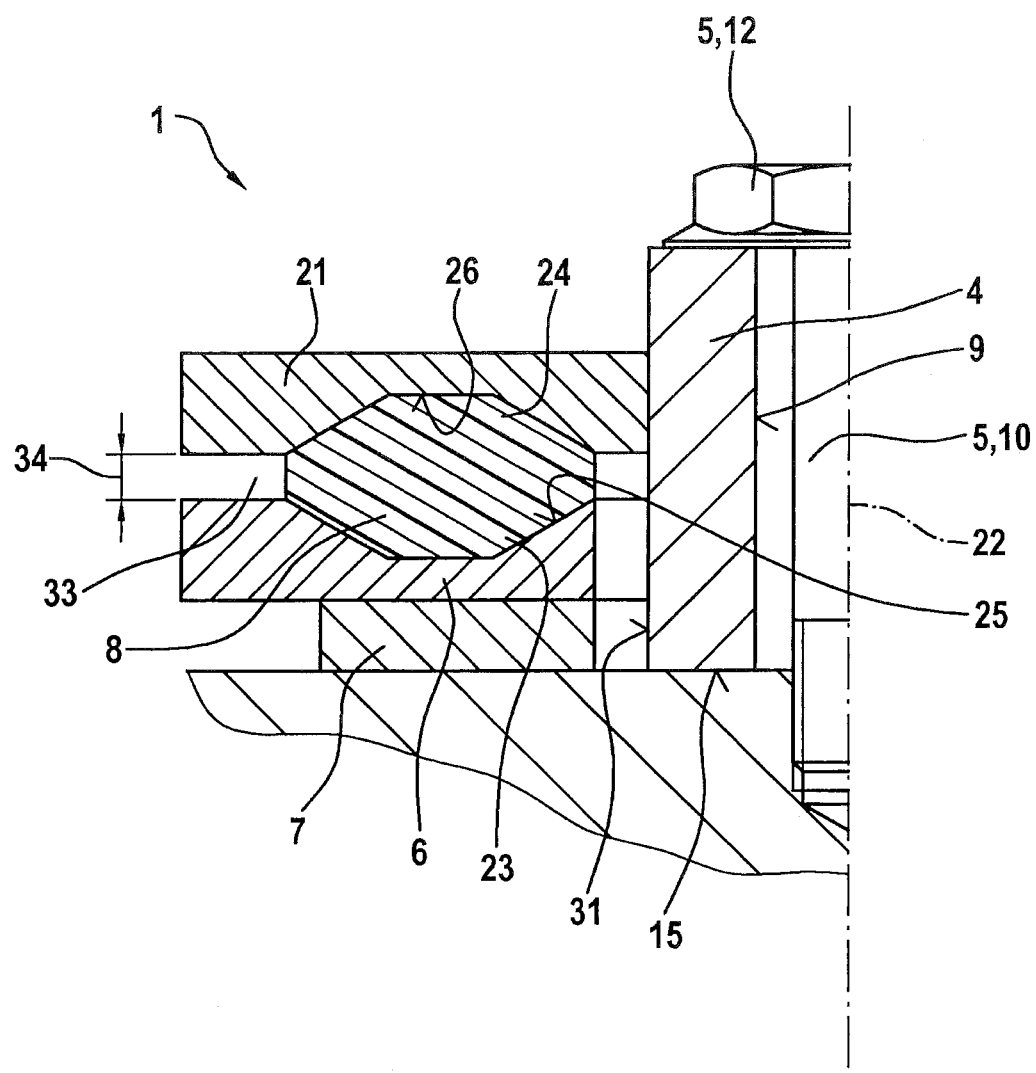
FIG. 3 is a partial schematic sectioned depiction of a holder, in accordance with a third exemplifying embodiment of the invention.

FIG. 3 is a partial schematic sectioned depiction of a decoupling element of a holder 1, in accordance with a third exemplifying embodiment. In this exemplifying embodiment decoupling element 8 has, in profile, an octagonal cross section. Decoupling element 8 is furthermore of annular configuration. Conformations 23, 24 engage respectively into a depression 25 of holding element 6 and into a depression 26 of preload element 21. A gap 33, that in the initial state has a gap dimension having an axial height 34 along axis 22, is furthermore constituted between preload element 21 and holding element 6. The gap dimension defined by axial height 34 ensures an elongation limit with regard to a load on decoupling element 8.

Figure 4:
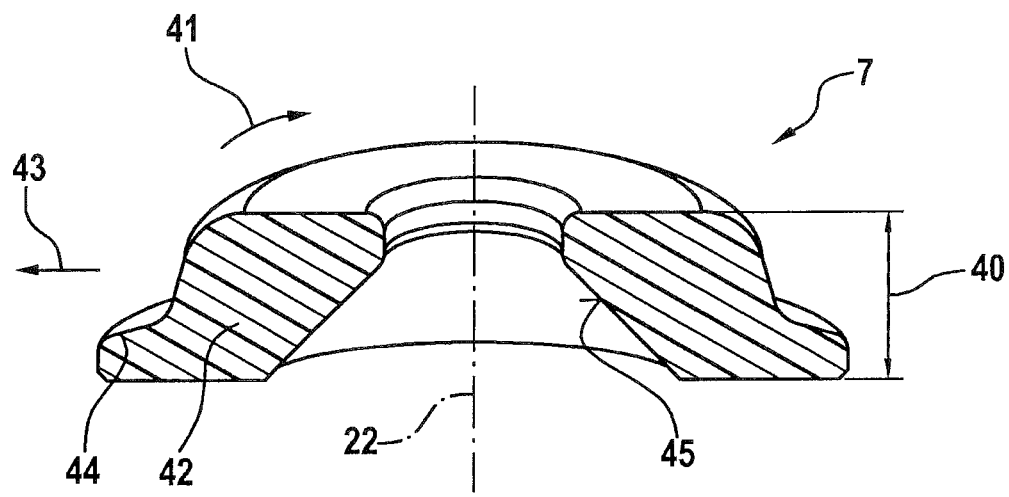
FIG. 4 is a partial schematic three-dimensional depiction of a decoupling element of a holder, in accordance with a fourth exemplifying embodiment of the invention.

FIG. 4 is a partial schematic three-dimensional depiction of a decoupling element 7 of a holder 1, in accordance with a fourth exemplifying embodiment. Decoupling element 7 has an axial thickness along axis 22 when no preload is present. Decoupling element 7 is configured with a cross section 42 that is rotationally symmetrical in a circumferential direction 41 around axis 22. Cross section 42 has a protrusion 44, extending in a radial direction 43, that forms an externally located rim 44 of decoupling element 7.

Decoupling element 7 furthermore has an internally located chamfer 45 that extends over more than half the axial thickness 40 of decoupling element 7 along axis 22 of attachment body 4.

In this exemplifying embodiment an impingement upon decoupling element 7 in any radial direction 43 always results in a comparable rise in a return force, acting on holding element 6, in correlation with the deflection of holding element 6. The shape of the spring characteristic curve is thus independent of the radial direction 43 that is selected.

Figure 5:
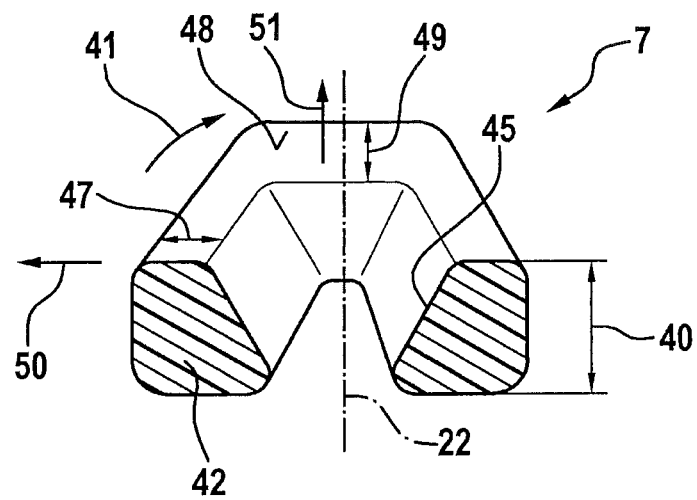
FIG. 5 is a partial schematic three-dimensional depiction of a decoupling element of a holder, in accordance with a fifth exemplifying embodiment of the invention.

FIG. 5 is a partial schematic three-dimensional depiction of a decoupling element of a decoupling element 7 of a holder 1, in accordance with a fifth exemplifying embodiment. In this exemplifying embodiment a radial extent 47 of decoupling element 7 on one side 48 differs from a radial extent 49 of decoupling element 7 on side 48. Radial extent 47 is considered here in a first radial direction 50, while radial extent 49 is considered in a second radial direction 51. Decoupling element 7 is thus shaped, in this exemplifying embodiment, in such a way that a first radial direction 50 and a second radial direction 51, which are oriented perpendicularly to axis 22 of attachment body 4, exist; a first spring characteristic curve that describes a correlation of a return force acting on holding element 6 along first radial direction 50 with a deflection of the holding element along first radial direction 50 relative to attachment body 4, and a second spring characteristic curve that describes a correlation of a return force acting on holding element 6 along second radial direction 51 with a deflection of holding element 6 along second radial direction 51 relative to attachment body 4, are different. Different spring characteristic curves in radial directions 50, 51 can thus be achieved by the fact that the stiffness is predefined to be rotationally non-symmetrical.

Figure 6A:
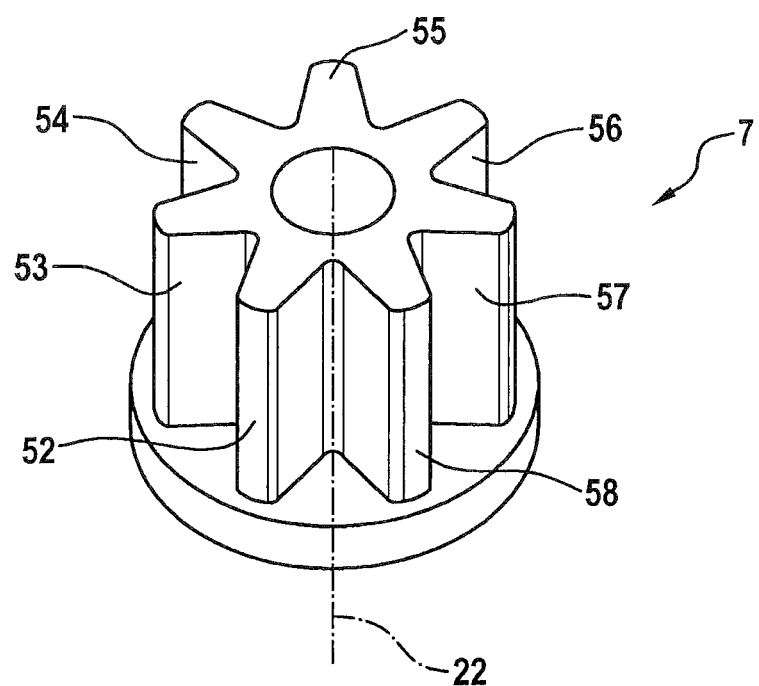
FIG. 6A is a schematic three-dimensional depiction of a decoupling element of a holder, in accordance with a sixth exemplifying embodiment of the invention.

FIG. 6A is a schematic three-dimensional depiction of a decoupling element 7 of a holder 1, in accordance with a sixth exemplifying embodiment. In this exemplifying embodiment decoupling element 7 has ribs 52 to 58 that extend along axis 22. These ribs 52 to 58 make it possible, inter alia, to vary a transverse stiffness. Upon a stress in an axial direction, ribs 52 to 58 initially yield relatively easily, which corresponds to a soft behavior. When the interstices between ribs 52 to 58 have been, so to speak, squeezed out, a harder elongation behavior then ensues. This is also relevant for tilts relative to axis 22.

Figure 6B:
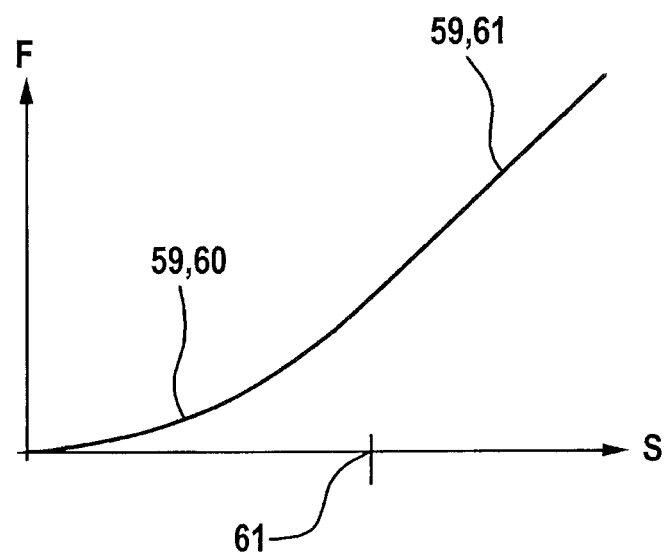
FIG. 6B shows a spring characteristic curve for a holder having the decoupling element depicted in FIG. 6A, in accordance with the sixth exemplifying embodiment of the invention.

FIG. 6B shows a spring characteristic curve 59 for a holder 1 having decoupling element 7 depicted in FIG. 6A, in accordance with the sixth exemplifying embodiment. An axial deflection s of holding element 6 relative to attachment body 4 is depicted on the abscissa, while a return force F acting on holding element 6 is plotted on the ordinate. With increasing deflection s, at first the spring stiffness rises superproportionally as illustrated by a segment 60 of spring characteristic curve 59. Starting at a deflection 61, the interstices between ribs 52 to 58 are, so to speak, squeezed out, resulting in a segment 61 of spring characteristic curve 59 in which the spring characteristic curve rises linearly, corresponding to a constant spring constant.

Figure 7A:
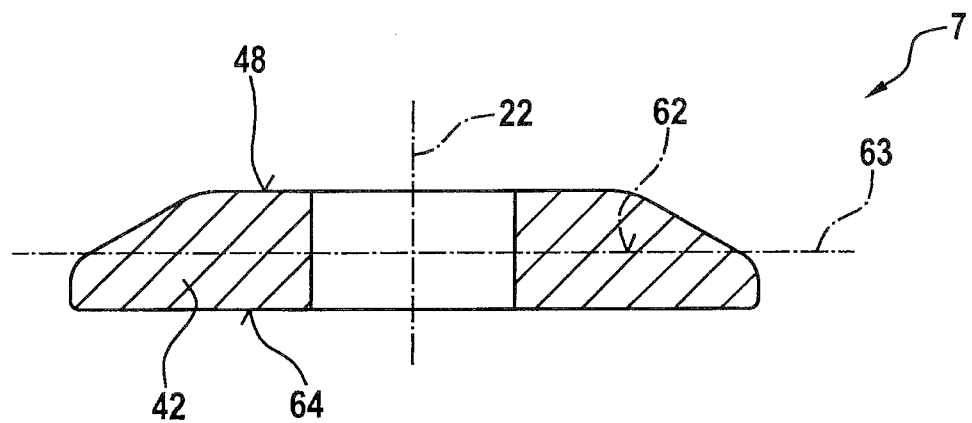
FIG. 7A is a schematic sectioned depiction of a decoupling element of a holder, in accordance with a seventh exemplifying embodiment of the invention.

FIG. 7A is a schematic sectioned depiction of a decoupling element 7 of a holder 1, in accordance with a seventh exemplifying embodiment. In this exemplifying embodiment a cross-sectional area 62 of decoupling element 7 which lies in a plane 63 that is oriented perpendicularly to axis 22 at least largely increases from side 48 to a side 64 of decoupling element 7. The result is that upon a deflection of the holding element in an axial direction along axis 22, the return force F that acts on holding element 6 increases superproportionally with deflection s.

Figure 7B:
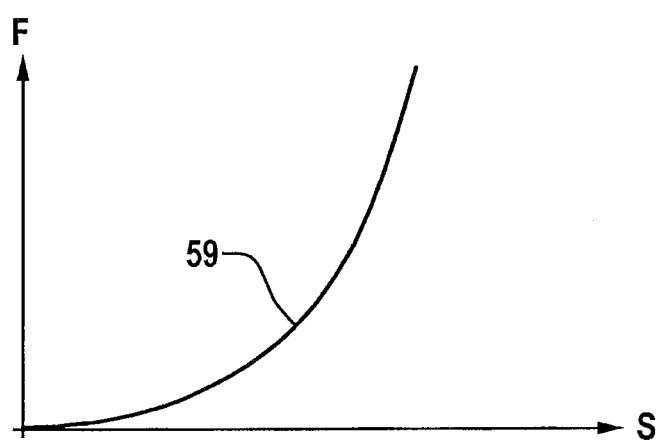
FIG. 7B shows a spring characteristic curve for a holder having the decoupling element depicted in FIG. 7A, in accordance with the seventh exemplifying embodiment of the invention.

FIG. 7B shows a spring characteristic curve 59 for holder 1 having decoupling element 7A depicted in FIG. 7A, in accordance with the seventh exemplifying embodiment. The superproportional rise in spring characteristic curve 59 with deflection s shows an example of a behavior that is made possible by the conformation of decoupling element 7 which is illustrated in FIG. 7A.

Figure 8A:
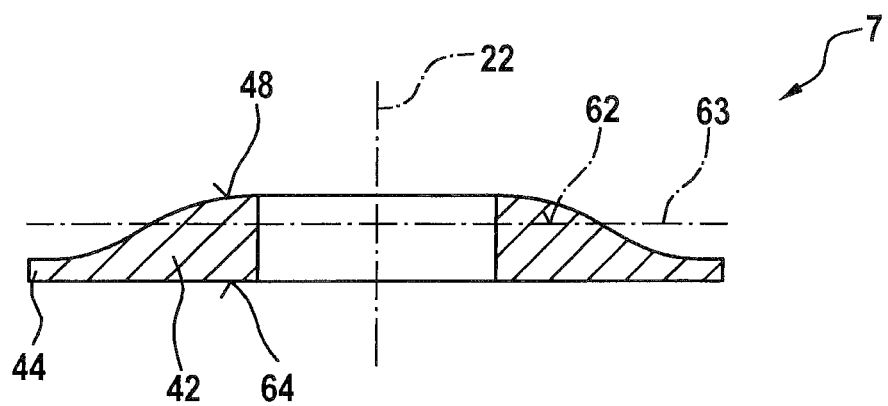
FIG. 8A is a schematic sectioned depiction of a decoupling element of a holder, in accordance with an eighth exemplifying embodiment of the invention.

FIG. 8A is a schematic sectioned depiction of a decoupling element 7 of a holder 1, in accordance with an eighth exemplifying embodiment. In this exemplifying embodiment a protrusion 44, which forms an externally located rim 44 of decoupling element 7, is provided in cross section 42. Along axis 22, a cross-sectional area 62 of decoupling element 7 which lies in plane 63 at first increases from side 48 up to the beginning of externally located rim 44. In the region of rim 44, cross-sectional area 62 is at least approximately constant along axis 22.

Figure 8B:
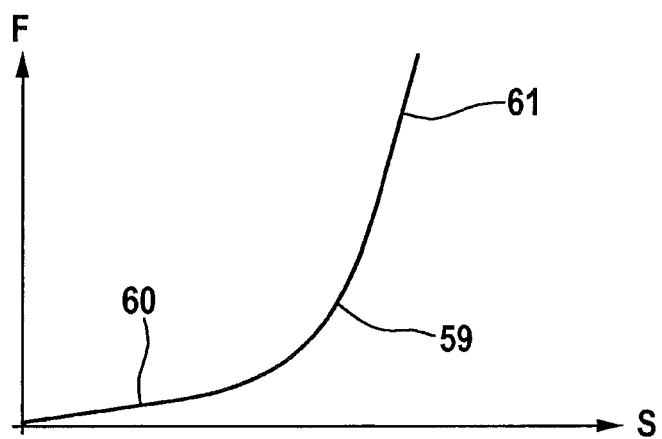
FIG. 8B shows a spring characteristic curve for a holder having the decoupling element depicted in FIG. 8A, in accordance with the eighth exemplifying embodiment of the invention.

FIG. 8B shows a spring characteristic curve 59 for a holder 1 having decoupling element 7 depicted in FIG. 8A, in accordance with the eighth exemplifying embodiment. As the axial deflection s increases, at first there is a comparatively slow rise in the return force F acting on holding element 6 in an axial direction. Conversely, when decoupling element 7 is already greatly compressed (which corresponds to a large deflection s), what then results, because of the now comparatively large effective cross-sectional area that converges toward cross-sectional area 62 of decoupling element 7 including rim 44, is a comparatively high spring stiffness as illustrated by a steep segment 61 of the spring characteristic curve. A corresponding transition region furthermore occurs between a segment 50 of the spring characteristic curve having an initially shallow slope and segment 61 having the steep slope.

Figure 9:
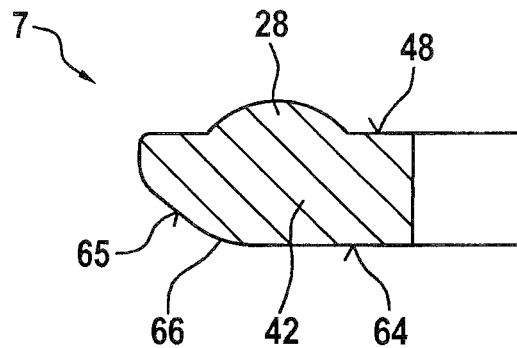
FIG. 9 is a partial schematic sectioned depiction of a decoupling element of a holder, in accordance with a ninth exemplifying embodiment of the invention.

FIG. 9 is a partial schematic sectioned depiction of a decoupling element 7 of a holder 1, in accordance with a ninth exemplifying embodiment. In this exemplifying embodiment decoupling element 7 has a bulge-shaped conformation 28 only on side 48. Decoupling element 7 furthermore has an externally located chamfer 65. A transition between externally located chamfer 65 and side 64 is configured as an edge radius 66.

Figure 10:
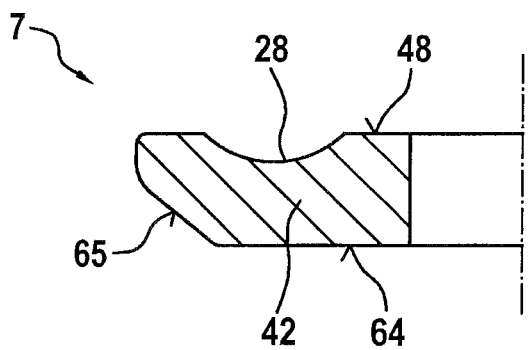
FIG. 10 is a partial schematic sectioned depiction of a decoupling element of a holder, in accordance with a tenth exemplifying embodiment of the invention.

FIG. 10 is a partial schematic sectioned depiction of a decoupling element 7 of a holder 1, in accordance with a tenth exemplifying embodiment. In this exemplifying embodiment decoupling element 7 has an externally located chamfer 65. In addition, decoupling element 7 has a conformation 28, configured as a depression, only on side 48.

Figure 11:
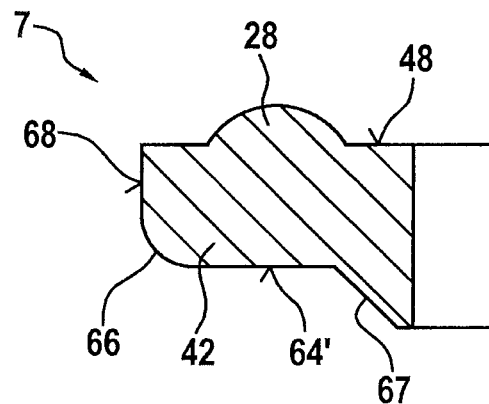
FIG. 11 is a partial schematic sectioned depiction of a decoupling element of a holder, in accordance with an eleventh exemplifying embodiment of the invention.

FIG. 11 is a partial schematic sectioned depiction of a decoupling element 7 of a holder 1, in accordance with an eleventh exemplifying embodiment. In this exemplifying embodiment decoupling element 7 has a bulge-shaped conformation 28 only on side 48. Decoupling element 7 furthermore has a chamfered step 67 at end surface 64'. Decoupling element 7 furthermore has an edge radius 66 at externally located enveloping surface 68.

Figure 12:
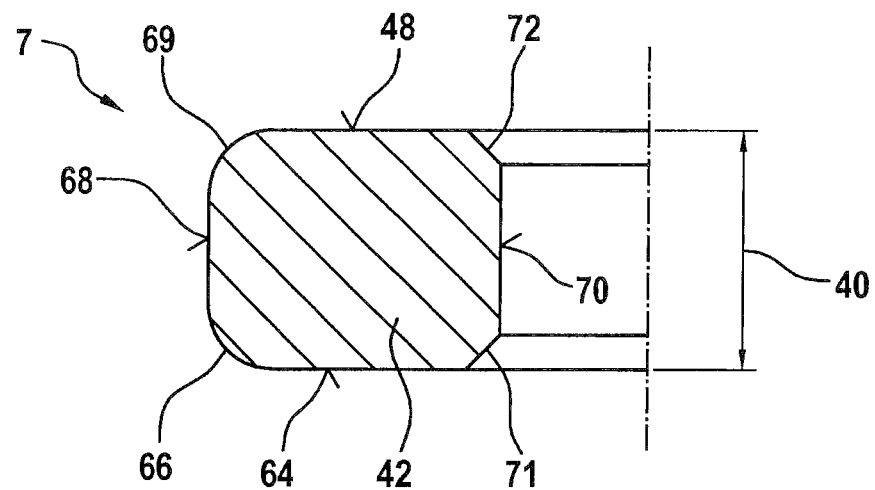
FIG. 12 is a partial schematic sectioned depiction of a decoupling element of a holder, in accordance with a twelfth exemplifying embodiment of the invention.

FIG. 12 is a partial schematic sectioned depiction of a decoupling element 7 of a holder 1, in accordance with a twelfth exemplifying embodiment. In this exemplifying embodiment decoupling element 7 has edge radii 66, 69 at externally located enveloping surface 68. Bevels 71, 72 that extend over less than half of an axial thickness 40 of decoupling element 7 are furthermore configured at internally located enveloping surface 70. Edge radii 66, 69 at enveloping surface 68 and bevels 71, 72 at internally located enveloping surface 70 represent recesses 66, 69, 71, 72 at the rim of enveloping surfaces 68, 70 of decoupling element 7, since they are adjacent to sides 48, 64.

Figure 13:
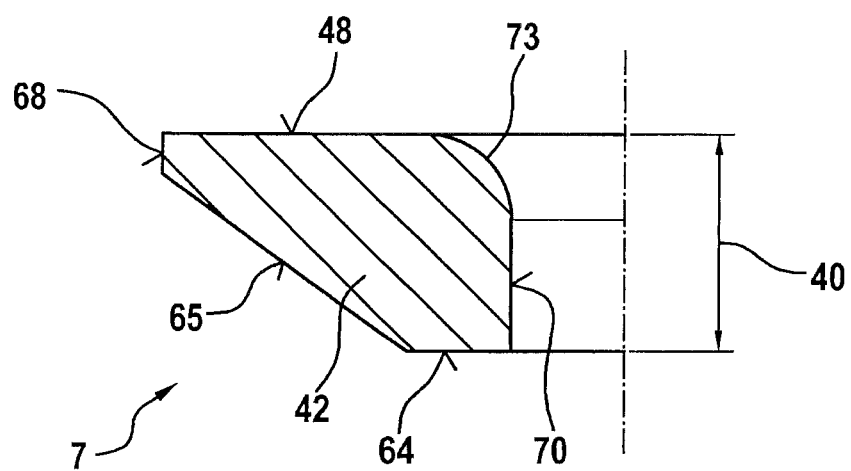
FIG. 13 is a partial schematic sectioned depiction of a decoupling element of a holder, in accordance with a thirteenth exemplifying embodiment of the invention.

FIG. 13 is a partial schematic sectioned depiction of a decoupling element 7 of a holder 1, in accordance with a thirteenth exemplifying embodiment. In this exemplifying embodiment decoupling element 7 has an externally located chamfer 65 that extends over more than half the axial extent 40 of decoupling element 7. Externally located chamfer 67 results in formation of a recess at the rim of externally located enveloping surface 68 of decoupling element 7, since recess 65 is adjacent to side 64. An edge radius 73, which constitutes a recess 73 at the rim of internally located enveloping surface 70, is furthermore configured at internally located enveloping surface 70.

Figure 14:
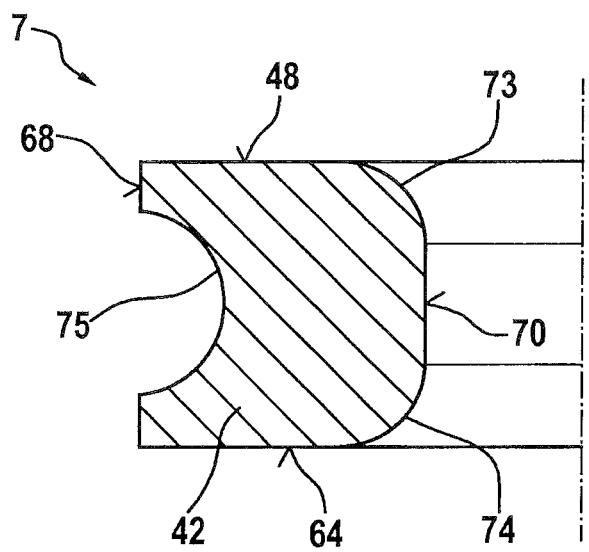
FIG. 14 is a partial schematic sectioned depiction of a decoupling element of a holder, in accordance with a fourteenth exemplifying embodiment of the invention.

FIG. 14 is a partial schematic sectioned depiction of a decoupling element of a holder 1, in accordance with a fourteenth exemplifying embodiment. In this exemplifying embodiment edge radii 73, 74 are provided at internally located enveloping surface 70. A recess 75 that is configured within externally located enveloping surface 68 is furthermore provided at enveloping surface 68. Recess 75 is thus configured in a manner spaced away from sides 48, 64.

Figure 15:
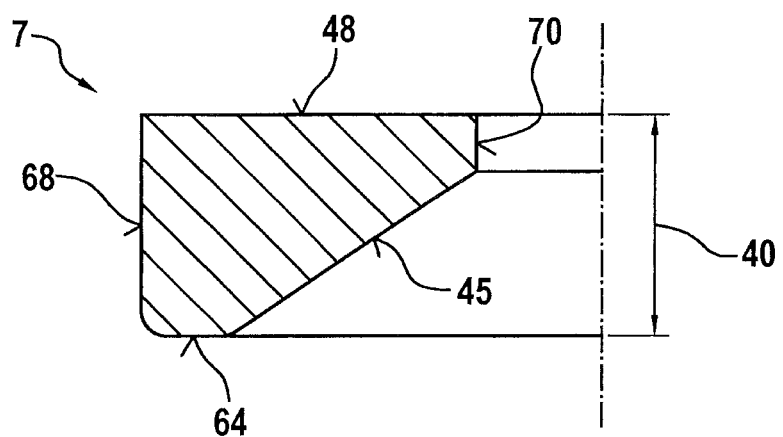
FIG. 15 is a partial schematic sectioned depiction of a decoupling element of a holder, in accordance with a fifteenth exemplifying embodiment of the invention.

FIG. 15 is a partial schematic sectioned depiction of a decoupling element 7 of a holder 1, in accordance with a fifteenth exemplifying embodiment. Here an internally located chamfer 45 that extends to side 64 is provided. Internally located chamfer 45 extends over more than half the axial thickness 40 of decoupling element 7.

Figure 16:
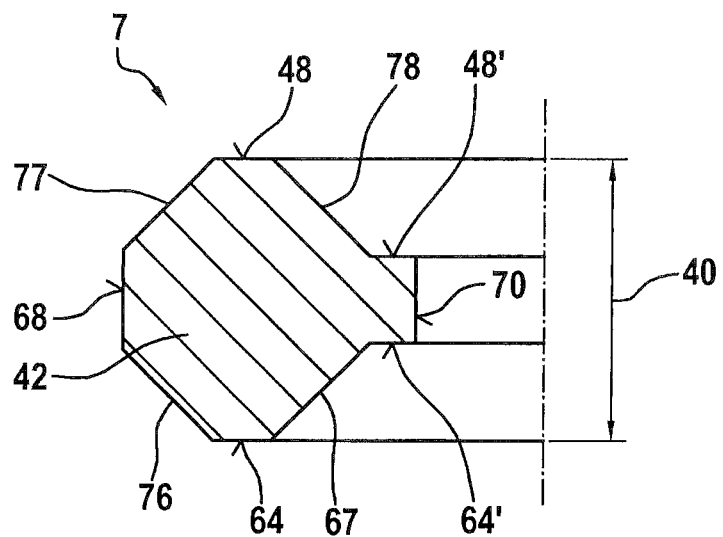
FIG. 16 is a partial schematic sectioned depiction of a decoupling element of a holder, in accordance with a sixteenth exemplifying embodiment of the invention.

FIG. 16 is a partial schematic sectioned depiction of a decoupling element 7 of a holder 1, in accordance with a sixteenth exemplifying embodiment. In this exemplifying embodiment decoupling element 7 has bevels 76, 77 at externally located enveloping surface 68. Bevels 76, 77 respectively extend over less than half the axial thickness 40 of decoupling element 7. Decoupling element 7 furthermore has a respective chamfered step 67, 78 on sides 48, 64. Stepped end surfaces 64', 48' are thus configured.

Figure 17:
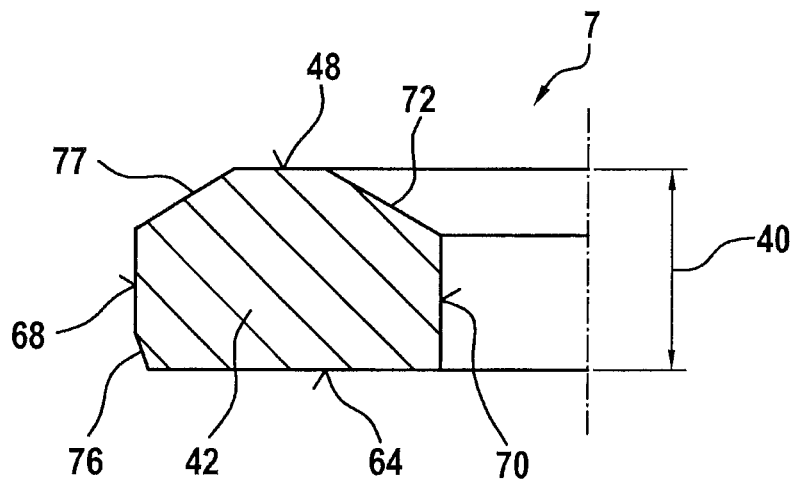
FIG. 17 is a partial schematic sectioned depiction of a decoupling element of a holder, in accordance with a seventeenth exemplifying embodiment of the invention.

FIG. 17 is a partial schematic sectioned depiction of a decoupling element 7 of a holder 1, in accordance with a seventeenth exemplifying embodiment. In this exemplifying embodiment a bevel 77, which extends over less than half the axial thickness 40 of decoupling element 7 and is adjacent to side 48, is configured at externally located enveloping surface 68. A bevel 72, which extends over less than half the axial thickness 40 of decoupling element 7 and is likewise adjacent to side 48, is furthermore configured at internally located enveloping surface 70. Recesses 72, 77 extending at the respective rim of enveloping surfaces 68, 70 are thus constituted. A bevel 76 is furthermore provided between side 64 and externally located enveloping surface 68.

Figure 18:
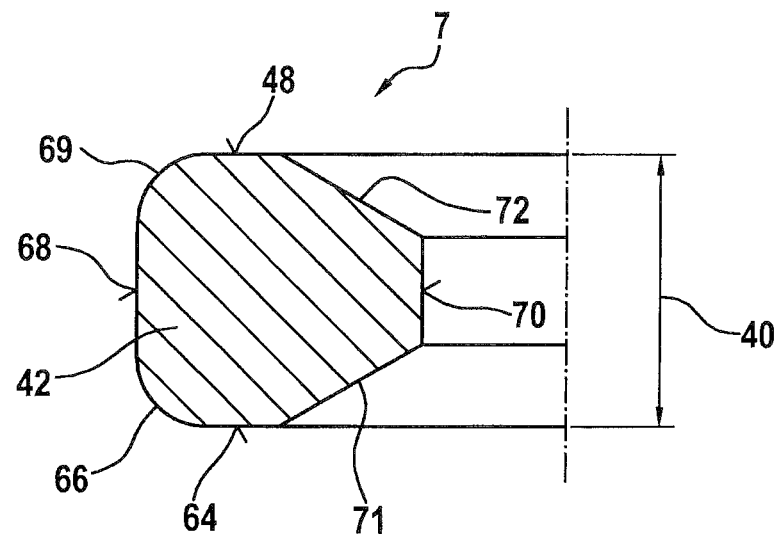
FIG. 18 is a partial schematic sectioned depiction of a decoupling element of a holder, in accordance with an eighteenth exemplifying embodiment of the invention.

FIG. 18 is a partial schematic sectioned depiction of a decoupling element 7 of a holder 1, in accordance with an eighteenth exemplifying embodiment. In this exemplifying embodiment bevels 71, 72 that extend respectively to side 48 and to side 64 are configured at the internally located enveloping surface. Bevels 71, 72 each extend over less than half the axial thickness 40 of decoupling element 7. Edge radii 66, 69 are furthermore configured at externally located enveloping surface 68.

Figure 19:
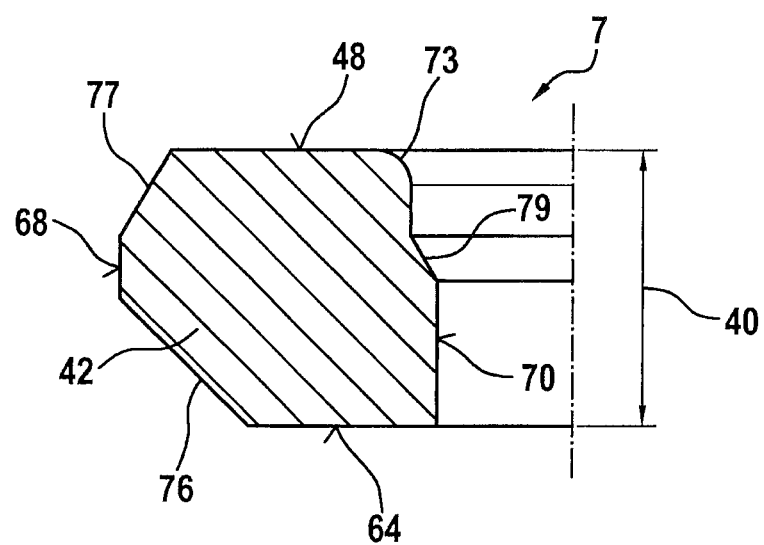
FIG. 19 is a partial schematic sectioned depiction of a decoupling element of a holder, in accordance with a nineteenth exemplifying embodiment of the invention.

FIG. 19 is a partial schematic sectioned depiction of a decoupling element 7 of a holder 1, in accordance with a nineteenth exemplifying embodiment. In this exemplifying embodiment bevels 76, 77 are configured at externally located enveloping surface 68. A step 79, which in this exemplifying embodiment is configured as a chamfered step 79, is furthermore provided at internally located enveloping surface 70. An edge radius 73 is furthermore provided toward side 48.

Figure 20:
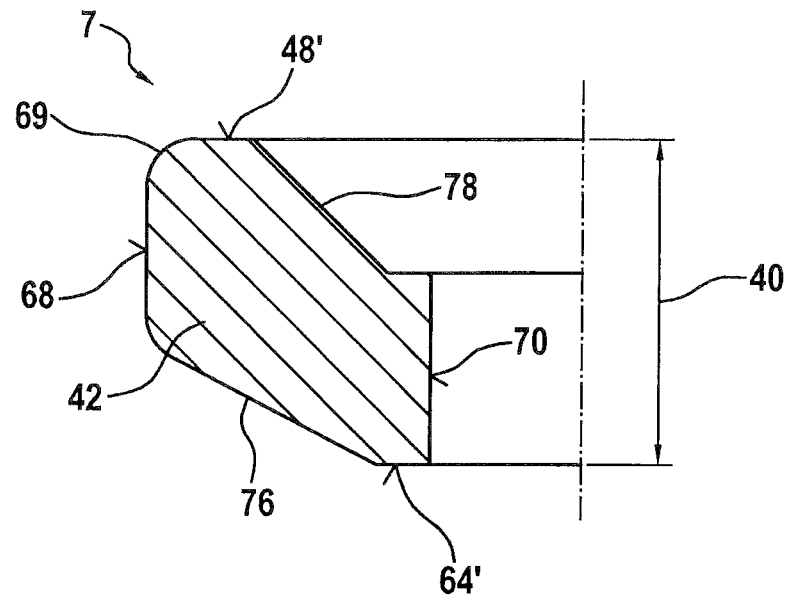
FIG. 20 is a partial schematic sectioned depiction of a decoupling element of a holder, in accordance with a twentieth exemplifying embodiment of the invention.

FIG. 20 is a partial schematic sectioned depiction of a decoupling element 7 of a holder 1, in accordance with a twentieth exemplifying embodiment. In this exemplifying embodiment a bevel 76 that extends over less than half the axial thickness 40 of decoupling element 7 is configured at end surface 64'. An edge radius 69, which constitutes a transition between externally located enveloping surface 68 and an end surface 48', is moreover provided. A chamfered step 78 is furthermore configured at end surface 48'. Bevel 76 and step 78 can be braced by the contact partner, so that the resulting reactions occur in angle-dependent fashion.

Figure 21:
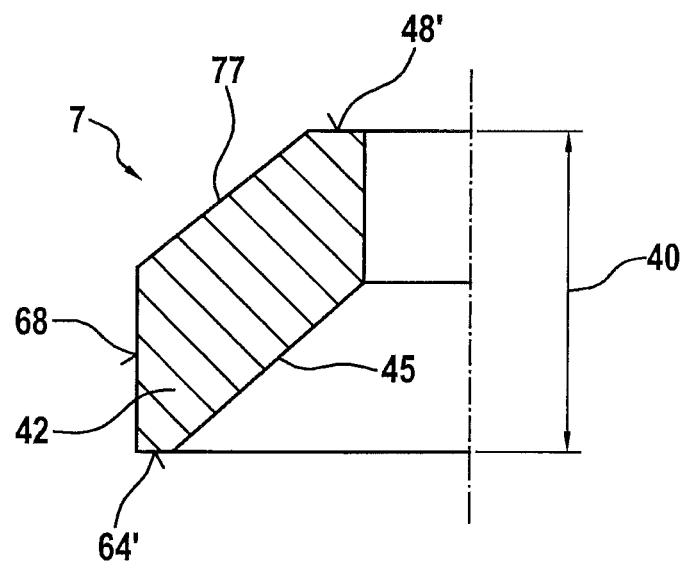
FIG. 21 is a partial schematic sectioned depiction of a decoupling element of a holder, in accordance with a twenty-first exemplifying embodiment of the invention.

FIG. 21 is a partial schematic sectioned depiction of a decoupling element 7 of a holder 1, in accordance with a twenty-first exemplifying embodiment. In this exemplifying embodiment a bevel 77 that extends over less than half the axial thickness 40 of the decoupling element is configured at end surface 48'. A chamfer 45 that extends over at least half the axial thickness 40 of decoupling element 7 is furthermore configured at end surface 64'. Bevel 77 and chamfer 45 can be braced, analogously to FIG. 20, by the respective contact partners.

Numerous possibilities for the conformation of a decoupling element 7, which optionally can also be implemented repeatedly and combined with one another in a different fashion, are thus depicted. The result is that the decoupling element can be shaped in such a way that a nonlinear spring characteristic curve is predefined in at least one spatial direction.

It is advantageous that recess 65, 66, 69, 71, 72, 73, 74, 76, 77, or end surface 48', 64' of decoupling element 7, is respectively braced by contact by way of holding element 6 and/or at least one countermember 20, 21, in particular support element 20 and/or preload element 21. Support occurs here at a contact surface respectively of recess 65, 66, 69, 71, 72, 73, 74, 76, 77 or of end surface 48', 64' of decoupling element 7.

The invention is not limited to the exemplifying embodiments described.

The invention claimed is:

1. A holder for attaching a component to an internal combustion engine, comprising:
    at least one decoupling element;
    an attachment body;
    an attachment unit; and
    a holding element;
    wherein the attachment body is configured to be attached to the internal combustion engine by way of the attachment unit, and the holding element is attached to the attachment body via the decoupling element, the decoupling element being shaped in such a way that in at least one spatial direction a nonlinear spring characteristic curve, which describes a correlation of a return force acting on the holding element with a deflection of the holding element relative to the attachment body, is predefined.

2. The holder as recited in claim 1, wherein the decoupling element is shaped in such a way that at least in an axial direction along an axis of the attachment body, a nonlinear spring characteristic curve, which describes a correlation of a return force acting on the holding element along the axis of the attachment body with a deflection of the holding element along the axis of the attachment body relative to the attachment body, is predefined.

3. The holder as recited in claim 1, wherein the decoupling element is shaped in such a way that at least in a radial direction which is oriented perpendicularly to an axis of the attachment body, a nonlinear spring characteristic, which describes a correlation of a return force acting on the holding element along the radial direction with a deflection of the holding element along the radial direction relative to the attachment body, is predefined.

4. The holder as recited in claim 1, wherein the decoupling element is shaped in such a way that a first radial direction and a second radial direction, which are oriented perpendicularly to an axis of the attachment body, exist, for which a first spring characteristic curve that describes a correlation of a return force acting on the holding element along the first radial direction with a deflection of the holding element along the first radial direction relative to the attachment body, and a second spring characteristic curve that describes a correlation of a return force acting on the holding element along the second radial direction with a deflection of the holding element along the second radial direction relative to the attachment body, are different.

5. The holder as recited in claim 1, wherein at least one of:
the decoupling element has at least one conformation which interacts in positively fitting fashion with a conformation of the holding element; and
the decoupling element has at least one conformation which interacts in positively fitting manner with a conformation of a preload element which is connected to the attachment body.

6. The holder as recited in claim 1, wherein at least one of (i) the decoupling element has at least one recess configured at the rim of an enveloping surface of the decoupling element, and (ii) the decoupling element has at least one recess configured inside an enveloping surface of the decoupling element.

7. The holder as recited in claim 6, wherein the recess at the rim of the enveloping surface of the decoupling element is configured as one of an edge radius, a bevel that extends over less than half of an axial thickness of the decoupling element along an axis of the attachment body, or a chamfer that extends over at least half of an axial thickness of the decoupling element along the axis of the attachment body.

8. The holder as recited in claim 6, wherein at least one of (i) the decoupling element has at least one step at at least one enveloping surface, and (ii) the decoupling element has at least one step at at least one end surface.

9. The holder as recited in claim 7, wherein the decoupling element has, at the at least one end surface, a contact geometry that varies in a circumferential direction with respect to an axis of the attachment body.

10. The holder as recited in claim 9, wherein at least one of (i) the contact geometry at the end surface of the decoupling element is segmented in the circumferential direction, and (ii) a radial contact component of the contact geometry at the end surface of the decoupling element varies in the circumferential direction.

11. The holder as recited in claim 8, wherein the decoupling element is braced one of at the recess or at the end surface of the decoupling element, by at least one of the holding element and at least one countermember.

12. The holder as recited in claim 1, wherein the decoupling element is not impinged upon by attachment force applied by said attachment unit.

13. The holder as recited in claim 1, wherein the decoupling element has a conformation having a bulge-shaped configuration.

14. The holder as recited in claim 1, wherein the decoupling element has a conformation configured as a depression.

* * * * *